United States Patent
Zimmerman et al.

(10) Patent No.: US 6,203,675 B1
(45) Date of Patent: *Mar. 20, 2001

(54) ELECTROCHEMICAL CONVERSION OF ANHYDROUS HYDROGEN HALIDE TO HALOGEN GAS USING AN ELECTROCHEMICAL CELL

(75) Inventors: William H. Zimmerman, Wilmington; James Arthur Trainham, Greenville, both of DE (US); Clarence Garlan Law, Jr., Franklin, TN (US); John Scott Newman, Kensington, CA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/095,353

(22) Filed: Jun. 9, 1998

Related U.S. Application Data

(60) Division of application No. 08/671,867, filed on Jun. 28, 1996, now Pat. No. 5,798,036, which is a continuation-in-part of application No. 08/432,403, filed on May 1, 1995, now abandoned, which is a continuation-in-part of application No. 08/156,196, filed on Nov. 22, 1993, now Pat. No. 5,411,641.

(51) Int. Cl.[7] .............................. C25B 9/00; C25B 11/10; C25B 11/20; C25B 13/08; C25B 15/08

(52) U.S. Cl. ........................ 204/252; 204/256; 204/266; 204/290 F; 204/292; 204/293; 204/296

(58) Field of Search .................................... 204/252, 296, 204/292, 293, 290 F, 283, 256, 266

(56) References Cited

U.S. PATENT DOCUMENTS

| | | | |
|---|---|---|---|
| 4,139,447 | 2/1979 | Faron et al. | 204/239 |
| 4,169,025 | 9/1979 | Needes | 204/98 |
| 4,191,618 | 3/1980 | Coker et al. | 204/98 |

(List continued on next page.)

FOREIGN PATENT DOCUMENTS

| | | |
|---|---|---|
| 1 179631 | 12/1984 | (CA) . |
| 1 195 949 | 10/1985 | (CA) . |
| 2 312 297 | 3/1973 | (DE) . |
| 363424 | 12/1931 | (GB) . |
| 861978 | 3/1961 | (GB) . |
| 56-36873 | 8/1981 | (JP) . |
| WO 94/17222 | 8/1994 | (WO) . |
| WO 95/14796 | 6/1995 | (WO) . |
| WO 95/14797 | 6/1995 | (WO) . |

OTHER PUBLICATIONS

Tanenaka, H. et al., "Solid Polymer Electrolyte Water Electrolysis", *Int. J. Hydrogen Energy*, 7(5), 397–403, 1982. (No month).

Appleby, A.J. et al., "Solid Polymer Acid Electrolytes" *Fuel Cell Handbook*, Van Nostrand Reinhold, New York, 10, 286–312, 1989. (No month).

Furuya, N. et al., "Chlorine Generator Using Gas–Diffusion Electrode", *Denki Kagaku* 57, 4:332–3, 1989. (No month).

Jewulski, J.R., et al., Solid–State Acid Proton Conductors, Final Report, Fossil, Work Performed Under Contract No. DE–AC21–88MC24218, Jan. 1999, Dec., 1990.

Wilson, M.S. et al., "High Performance Catalyzed Membranes of Ultra–low Pt Loadings For Polymer Electrolyte Fuel Cells", *J. Electrochem. Soc.*, 139(2), L28–L30, Feb. 1992.

Minz, F.R., "HCL–Electrolysis—Technology for Recycling Chlorine", Bayer AG, Conference on Electrochemical Processing, Innovation & Progress, Glasgow, Scotland, UK, Apr. 21–23, 1993.

*Primary Examiner*—Donald R. Valentine

(57) ABSTRACT

The present invention relates to an electrochemical cell and a process for converting anhydrous hydrogen halide to halogen gas using a membrane-electrode assembly (MEA) or a separate membrane and electrode arrangement, such as gas diffusion electrodes with a membrane.

24 Claims, 3 Drawing Sheets

U.S. PATENT DOCUMENTS

| | | | |
|---|---|---|---|
| 4,210,501 | 7/1980 | Dempsey et al. | 204/129 |
| 4,224,121 | 9/1980 | Dempsey et al. | 204/98 |
| 4,294,671 | 10/1981 | Balko | 204/128 |
| 4,311,568 | 1/1982 | Balko | 204/128 |
| 4,333,805 | 6/1982 | Davidson et al. | 204/98 |
| 4,386,987 | 6/1983 | Covitch et al. | 156/155 |
| 4,433,082 | 2/1984 | Grot | 524/755 |
| 4,453,991 | 6/1984 | Grot | 156/94 |
| 4,469,579 | 9/1984 | Covitch et al. | 204/283 |
| 4,595,579 | 6/1986 | Prudhon et al. | 423/487 |
| 4,959,132 | 9/1990 | Fedkiw, Jr. | 204/101 |
| 5,039,389 | 8/1991 | McMichael | 204/282 |
| 5,223,102 | 6/1993 | Fedkiw, Jr. et al. | 204/78 |
| 5,234,777 | 8/1993 | Wilson | 429/33 |
| 5,281,680 | 1/1994 | Grot | 526/243 |
| 5,330,860 | 7/1994 | Grot et al. | 429/42 |
| 5,399,184 | 3/1995 | Harada | 29/623.4 |
| 5,411,641 * | 5/1995 | Trainham, III et al. | 204/252 X |
| 5,415,888 | 5/1995 | Banerjee et al. | 427/125 |
| 5,447,636 | 9/1995 | Banerjee | 210/638 |
| 5,547,911 | 8/1996 | Grot | 502/101 |

* cited by examiner

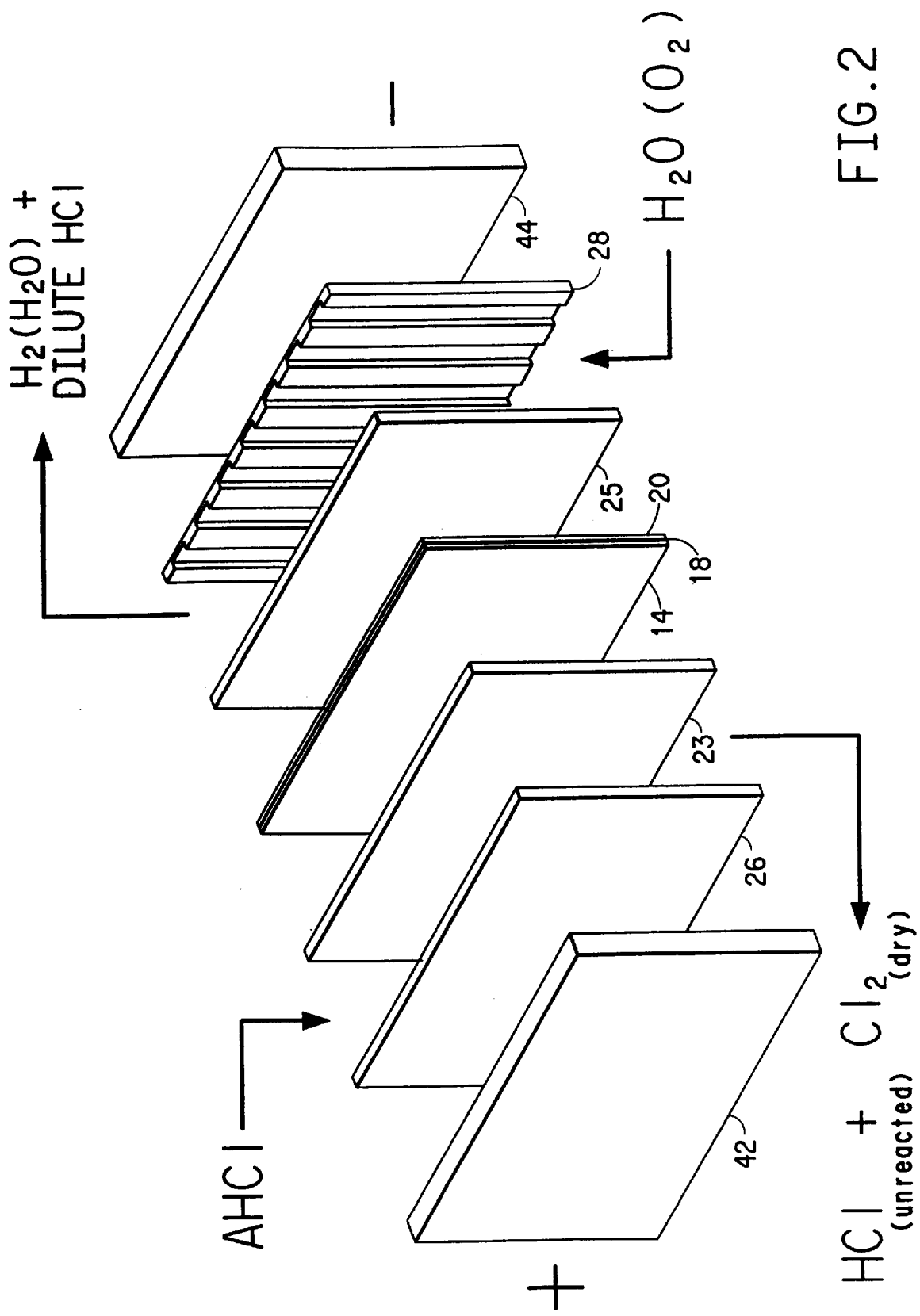

ELECTROCHEMICAL CONVERSION OF ANHYDROUS HYDROGEN HALIDE TO HALOGEN GAS USING AN ELECTROCHEMICAL CELL

This application is a divisional of U.S. application Ser. No. 08/671,867 filed Jun. 28, 1996, which issued as U.S. Pat. No. 5,798,036 on Aug. 25, 1998, and was surrendered for U.S. reissue application Ser. No. 09/466,659, filed Dec. 17, 1999, now pending, which is a continuation-in-part of U.S. application Ser. No. 08/432,403 filed May 1, 1995, now abandoned, which is a continuation-in-part of U.S. application Ser. No. 08/156,196 filed Nov. 22, 1993, which issued as U.S. Pat. No. 5,411,641 on May 2, 1995, and was surrendered for U.S. reissue application Ser. No. 09/093,468 filed Jun. 8, 1998, now allowed.

BACKGROUND OF THE INVENTION

1. Field of the Invention

The present invention relates to an electrochemical cell and a process for converting anhydrous hydrogen halide to halogen gas using a membrane-electrode assembly or a separate membrane and electrodes, such as gas diffusion electrodes.

2. Description of the Related Art

Hydrogen chloride (HCl) or hydrochloric acid is a reaction by-product of many manufacturing processes which use chlorine. For example, chlorine is used to manufacture polyvinyl chloride, isocyanates, and chlorinated hydrocarbons/fluorinated hydrocarbons, with hydrogen chloride as a by-product of these processes. Because supply so exceeds demand, hydrogen chloride or the acid produced often cannot be sold or used, even after careful purification. Shipment over long distances is not economically feasible. Discharge of the acid or chloride ions into waste water streams is environmentally unsound. Recovery and feedback of the chlorine to the manufacturing process is the most desirable route for handling the HCl by-product.

A number of commercial processes have been developed to convert HCl into usable chlorine gas. See, e.g., F. R. Minz, "HCl-Electrolysis—Technology for Recycling Chlorine", Bayer AG, Conference on Electrochemical Processing, Innovation & Progress, Glasgow, Scotland, UK, Apr. 21–23, 1993. The commercial processes fall into two categories: thermal catalytic oxidation processes and electrochemical processes.

The current commercial thermal catalytic oxidation processes for converting anhydrous HCl and aqueous HCl into chlorine are the "Shell-Chlor", the "Kel-Chlor" and the "MT-Chlor" processes. These processes are based on the Deacon reaction. Another thermal catalytic oxidation process based on the Deacon reaction which is currently being investigated, but which is not yet commercial, is the Minet process. The original Deacon reaction as developed in the 1870's made use of a fluidized bed containing a copper chloride salt which acted as a catalyst. The commercial processes based on the Deacon reaction have used other catalysts in addition to or in place of the copper used in the original Deacon reaction, such as rare earth compounds, various forms of nitrogen oxide and chromium oxide in order to improve the rate of conversion, to reduce the energy input and to reduce the corrosive effects on processing equipment produced by harsh chemical reaction conditions associated with these processes. However, in general these thermal catalytic oxidation processes are complicated because they require separating the different reaction components in order to achieve product purity. They also involve the production of highly corrosive intermediates, which necessitates expensive construction materials for the reaction systems. Moreover, these thermal catalytic oxidation processes are operated at elevated temperatures of 200° C. and above.

Electrochemical processes convert aqueous HCl to chlorine gas by passing direct electrical current through a solution. The current commercial electrochemical process is known as the Uhde process. In the Uhde process, aqueous HCl solution of approximately 22% is fed at 65° to 80° C. to both compartments of an electrochemical cell, where exposure to a direct current in the cell results in an electrochemical reaction and a decrease in HCl concentration to 17% with the production of chlorine gas and hydrogen gas. The chlorine gas produced by the Uhde process is wet, usually containing about 1% to 2% water. This wet chlorine gas must then be further processed to produce a dry, usable gas. If the concentration of HCl in the water becomes too low, it is possible for oxygen to be generated from the water present in the Uhde process. Further, the presence of water in the Uhde system limits the current densities at which the cells can perform to less than 500 amps./ft.$^2$ (5.38 kA/m$^2$), because of this side reaction. The side reaction results in reduced electrical efficiency and corrosion of the cell components.

Furthermore, electrolytic processing of aqueous HCl can be mass-transfer limited. Mass-transfer of species is very much influenced by the concentration of the species as well as the rate of diffusion. The diffusion coefficient and the concentration of species to be transported are important factors which affect the rate of mass transport. In an aqueous solution, the diffusion coefficient of a species is ~$10^{-5}$ cm$^2$/sec. In a gas, the diffusion coefficient is dramatically higher, with values ~$10^{-2}$ cm$^2$/sec. In normal industrial practice for electrolyzing aqueous hydrogen chloride, the practical concentration of hydrogen chloride or chloride ion is ~17% to 22%, whereas the concentration of hydrogen chloride is 100% in a gas of anhydrous hydrogen chloride. Above 22%, conductance drops, and the penalty, in terms of additional power, for electrolyzing hydrogen chloride begins to climb. Below 17%, oxygen can be evolved from water, corroding the cell components, reducing electrical efficiency, and contaminating the chlorine.

U.S. Pat. No. 4,311,568 to Balko also describes an aqueous electrochemical process for converting HCl to chlorine. However, aqueous electrochemical processes for converting HCl to chlorine are hampered by oxygen evolution. Oxygen evolution occurs when there is chloride starvation in the anode, and the cell current is sustained by the electrolysis of water derived from aqueous hydrogen chloride and/or from water within a hydrated membrane. Thus, in Balko, controlling and minimizing oxygen evolution is an important consideration. In general, the rate of an electrochemical process is characterized by its current density. In Balko, as overall current density is increased, the rate of oxygen evolution increases, as evidenced by the increase in the concentration of oxygen found in the chlorine produced. Balko can run at higher current densities for a short period of time, but is limited by the deleterious effects of oxygen evolution. If the Balko cell were to be run at higher current densities for any length of time, the anode would be destroyed.

Some electrochemical cells, such as that disclosed in U.S. Pat. No. 4,311,568 to Balko, employ a membrane and electrodes which are physically separate elements. Such an arrangement has non-uniformities in both the membrane and the electrodes, resulting in uneven contact therebetween and less utilization of the catalyst than if the contact between the membrane and the electrodes were uniform. Accordingly, the current density of such a cell is limited not only by the presence of water, as discussed above, but also by catalyst utilization. Improved catalyst utilization has been achieved by a membrane-electrode assembly, as disclosed in U.S. Pat. No. 5,330,860 to Grot and Banerjee. This Patent discloses the use of a membrane-electrode assembly in an aqueous electrolytic cell or a fuel cell.

Thus, there exists a need to develop an electrochemical cell which is able to directly convert anhydrous hydrogen halide to essentially dry halogen gas which can achieve much higher current densities than can be achieved by electrochemical cells of the prior art. In addition, there exists a need to develop an electrode system which has improved catalyst utilization than electrodes of the prior art.

SUMMARY OF THE INVENTION

The present invention solves the problems of the prior art by providing an electrochemical cell and a process which achieve much higher current densities than those achieved by electrochemical cells of the prior art by employing a membrane-electrode assembly. In particular, the membrane-electrode assembly of the present invention is characterized by a uniform coating of electrochemically active material and even particle distribution of the material.

By employing a membrane-electrode assembly, where particles of electrochemically active material used for an anode and a cathode are applied directly to a membrane, the surface area contact between the electrochemically active material and the membrane is greatly increased, as compared to separate element membrane and electrode arrangements of the prior art. This increased contact enables the cell of the present invention to be run at higher current densities at a given voltage than electrochemical cells of the prior art. And as current density increases, capital investment decreases, making the present invention particularly attractive from a capital investment view point.

The electrochemical cell and process of the present invention also require lower operating costs than the electrochemical conversions of hydrogen chloride of the prior art. This is because, in general, for electrochemical conversions, as voltage increases the power cost per unit of $Cl_2$ produced increases. The voltage required to carry out the electrochemical conversion of the present invention at a given current density is lower than the voltage at that given current density required by a corresponding electrochemical conversion of the prior art, (provided that the given current density can even be achieved by the prior art). Thus, this advantage can translate directly into lower power costs per pound of say, chlorine, generated than in the aqueous electrochemical processes of the prior art.

Moreover, the electrochemical cell and process of the present invention allow for direct processing of anhydrous hydrogen halide to essentially-dry halogen gas. The term "direct" means that the electrochemical cell of the present invention obviates the need to convert essentially anhydrous hydrogen halide to aqueous hydrogen halide before electrochemical treatment or the need to remove water from the halogen gas produced. This direct production of essentially dry halogen gas, when done, for example, for chlorine, is less capital intensive than processes of the prior art, which require separation of water from the chlorine gas.

The electrochemical cell and process of the present invention also provide a process which produces drier chlorine gas with fewer processing steps as compared to that produced by electrochemical or catalytic systems of the prior art, thereby simplifying processing conditions and reducing capital costs.

To achieve the foregoing advantages, in accordance with the present invention, there is provided an electrochemical cell for the direct production of essentially anhydrous hydrogen halide to essentially dry halogen gas comprising a membrane electrode assembly. The membrane electrode assembly includes means for oxidizing molecules of essentially anhydrous hydrogen halide to produce essentially dry halogen gas and protons, cation-transporting means for transporting the protons therethrough, wherein the oxidizing means is disposed in contact with one side of the cation-transporting means, and means for reducing the transported protons disposed in contact with the other side of the cation-transporting means, wherein the oxidizing means and the reducing means comprises particles of an electrochemically active material applied to the cation-transporting means.

Further in accordance with the present invention, there is provided an electrochemical cell for the direct production of essentially dry halogen gas from essentially anhydrous hydrogen halide. The electrochemical cell comprises means for oxidizing molecules of essentially anhydrous hydrogen halide to produce essentially dry halogen gas and protons, proton-transporting means for transporting the protons therethrough, wherein the oxidizing means is disposed in contact with one side of the proton-transporting means and the proton-transporting means is a membrane comprising a copolymer of at least two monomers, and at least one of the monomers has a pendant sulfonic acid group and means for reducing the transported protons, wherein the reducing means is disposed in contact with the other side of the proton-transporting means.

Further in accordance with the present invention, there is provided a process for the direct production of essentially dry halogen gas from essentially anhydrous hydrogen halide. The process comprises the steps of feeding molecules of essentially anhydrous hydrogen halide to an inlet of an electrochemical cell comprising a cation-transporting membrane, an anode disposed in contact with one side of the membrane and a cathode disposed in contact with the other side of the membrane and applying a voltage to the anode and the cathode such that the anode is at a higher potential than the cathode, wherein the molecules of the essentially anhydrous hydrogen halide are transported to the anode, the molecules are oxidized at the anode to produce essentially dry halogen gas and protons, the protons are transported through the cation-transporting membrane of the electrochemical cell, and the transported protons are reduced at the cathode.

Further in accordance with the present invention, there is provided a process for the direct production of essentially dry halogen gas from essentially anhydrous hydrogen halide. The process comprises the steps of feeding molecules of essentially anhydrous hydrogen halide to an inlet of an electrochemical cell, wherein the cell comprises a membrane-electrode assembly including an anode disposed in contact with one side of the membrane and a cathode disposed in contact with the other side of the membrane, where the anode and the cathode comprise particles of an electrochemically active material applied to the membrane applying a voltage to the electrochemical cell so that the anode is at a higher potential than the cathode, wherein molecules of essentially anhydrous hydrogen halide are transported to the membrane-electrode assembly, the molecules are oxidized at the anode to produce essentially dry halogen gas and protons, the protons are transported through the cation-transporting membrane, and the transported protons are reduced at the cathode.

Further in accordance with the present invention, there is provided a method of making a membrane-electrode assembly. The method comprises the steps of adding particles of an electrochemically active material to a solution comprising a binder polymer and a mixture of perfluoro(methyl-di-n-butyl)amine and perfluoro(tri-n-butylamine) to form a coating formulation and coating a membrane with the coating formulation.

BRIEF DESCRIPTION OF THE DRAWINGS

FIG. 2 is a perspective view of the electrochemical cell of the present invention, illustrated for the case where anhydrous hydrogen chloride is converted to essentially dry chlorine.

DESCRIPTION OF THE PREFERRED EMBODIMENTS

Reference will now be made in detail to the present preferred embodiments of the invention as illustrated in the accompanying drawings.

In accordance with the present invention, there is provided an electrochemical cell which directly produces essentially dry halogen gas from essentially anhydrous hydrogen halide. Such a cell is shown at 10 in FIGS. 1 and 2. In a first embodiment of the present invention, a halogen gas, such as chlorine gas, as well as hydrogen, is produced in the cell of the present invention. In a second embodiment, water, as well as a halogen gas, such as chlorine gas, is produced in this cell, as will be explained more fully below.

Figure 1:
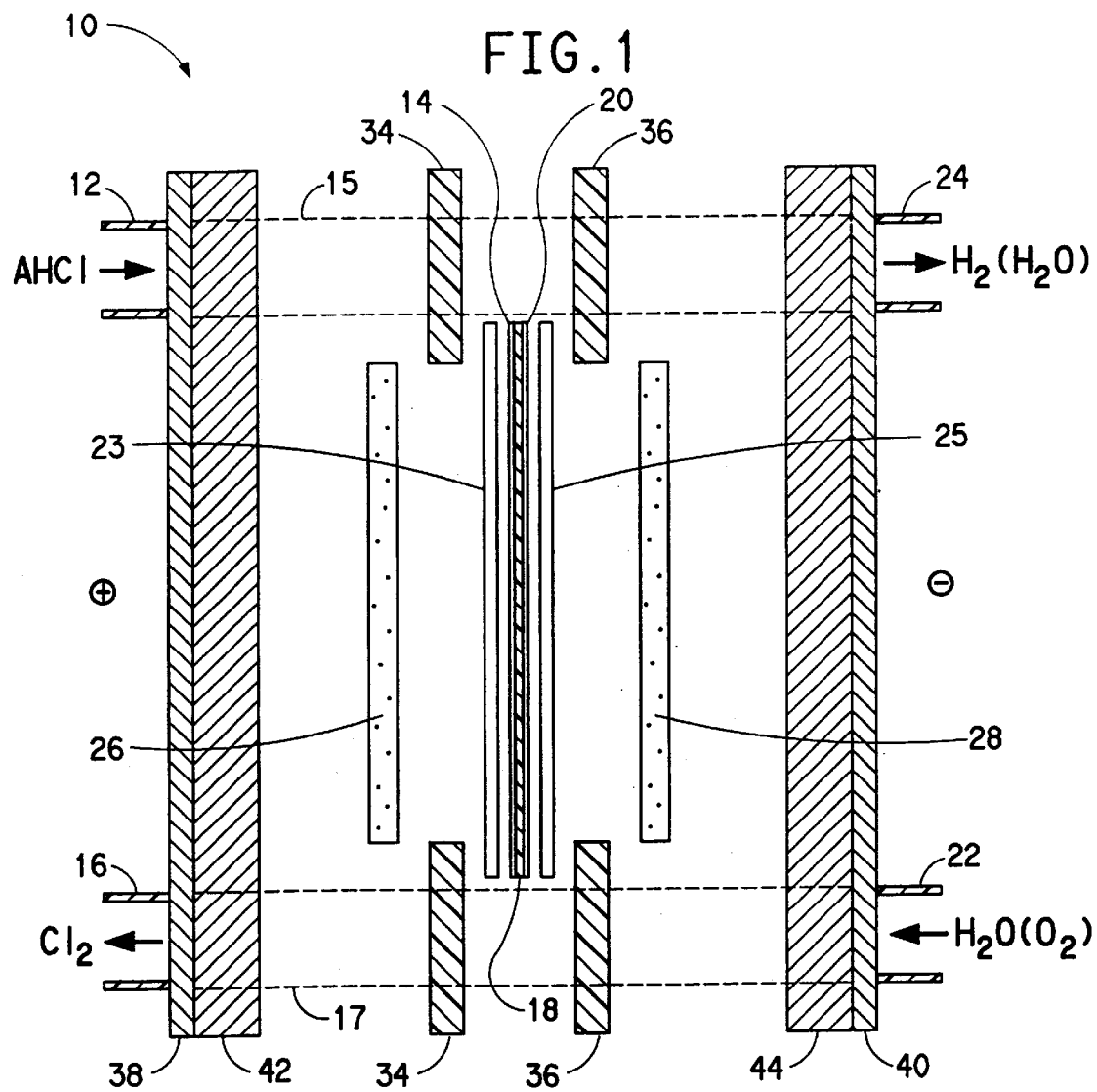
FIG. 1 is a schematic diagram showing the details of an electrochemical cell for producing halogen gas from anhydrous hydrogen halide according to the present invention.

The electrochemical cell of the present invention comprises means for oxidizing molecules of essentially anhydrous hydrogen chloride to produce essentially dry halogen gas and protons. The oxidizing means comprises an electrode, or more specifically, an anode 12 as shown in FIGS. 1 and 2. The electrochemical cell of the present invention also comprises inlet means for introducing molecules of essentially anhydrous hydrogen halide to the oxidizing means. The inlet means comprises an anode-side inlet 14 as shown in FIG. 1. The electrochemical cell of the present invention also includes an anode-side outlet 16 as shown in FIG. 1. Since in the illustrated case, anhydrous HCl is carried through the anode-side inlet, and chlorine gas is carried through the outlet, it is preferable that the inlet and the outlet are lined with a fluoropolymer resin, sold by E. I. du Pont de Nemours and Company (hereinafter referred to as "DuPont") under the trademark TEFLON® (hereinafter referred to as "PFA").

The electrochemical cell of the present invention also comprises cation-transporting means, or more specifically, proton-transporting means, for transporting the protons therethrough, wherein the oxidizing means is disposed in contact with one side of the cation-transporting means, or proton-transporting means. Preferably, the cation-transporting means is a cation-transporting, or proton-transporting, membrane 18, where the anode is disposed in contact with one side of the membrane as shown in FIGS. 1 and 2.

The electrochemical cell of the present invention also comprises means for reducing the transported protons disposed in contact with the other side of the cation-transporting means. The reducing means comprises an electrode, or more specifically, a cathode 20, where cathode 20 is disposed in contact with the other side (as opposed to the side which is in contact with the anode) of membrane 18 as illustrated in FIGS. 1 and 2. Cathode 20 has a cathode-side inlet 22 and a cathode-side outlet 24 as shown in FIG. 1.

Both the oxidizing means, or anode, and the reducing means, or cathode, comprise particles of an electrochemically active material. In one case, i.e., the membrane-electrode, or MEA, embodiment, the electrochemically active material may applied to the cation-transporting membrane. In this case, the electrochemically active material forms a catalyst layer on the membrane. The particles may be applied at or under the surface of the membrane. In another case, the membrane and the electrodes may be separate elements. For example, the anode and the cathode may be porous, gas-diffusion electrodes. Such electrodes provide the advantage of high specific surface area, as know to one skilled in the art.

In either the MEA or the separate membrane electrode case, the electrochemically active material may comprise any type of metallic particle or metallic oxide particle, as long as the material can support charge transfer and is sufficiently stable in the environment of an electrochemical cell. The electrochemically active material may comprise a metal such as platinum, ruthenium, osmium, rhodium, iridium, palladium, titanium, and the oxides, alloys or mixtures thereof. Gold, rhenium, tin and zirconium, and the oxides, alloys or mixtures thereof may also be used. In one embodiment, the electrochemically active material used for both the anode and the cathode may be ruthenium dioxide. In another embodiment, the electrochemically active material of the anode and the cathode may comprise platinum. It should be noted that different materials may be used for the electrochemically active material for the anode and the cathode. Thus, for example, in another embodiment, the electrochemically active material of the anode comprises ruthenium dioxide, and the electrochemically active material of the cathode comprises platinum. Other electrochemically active materials suitable for use with the present invention may include, but are not limited to, transition metal macro cycles in monomeric and polymeric forms and transition metal oxides, including perovskites and pyrochores.

The electrochemically active material may comprise a catalyst material on a support material. The support material may comprise particles of carbon and particles of polytetrafluoroethylene, (hereinafter referred to as "PTFE") which is sold under the trademark "TEFLON®", and is commercially available from DuPont. The electrochemically active material may be bonded by virtue of the PTFE to a support structure of carbon paper or graphite cloth and hot-pressed to the cation-transporting membrane. The hydrophobic nature of the PTFE does not allow a film of water to form at the anode, where a water barrier would hamper the diffusion of HCl to the reaction sites of the electrochemically active material.

The loadings of electrochemically active material may vary based on the method of application to the membrane.

Hot-pressed, gas-diffusion electrodes typically have loadings of 0.10 to 0.50 mg/cm$^2$. Other loadings are possible with other available methods of deposition, such as the MEA embodiment, where the electrochemically active material is applied to the cation-transporting membrane. In this embodiment, loadings as low as 0.017 mg. of active material per cm$^2$ have been achieved, although the loadings could be higher. A description of a low loading system where electrochemically active materials are distributed onto membranes can be found in Wilson and Gottesfeld, "High Performance Catalyzed Membranes of Ultra-low Pt Loadings for Polymer Electrolyte Fuel Cells", Los Alamos National Laboratory, J. Electrochem. Soc., Vol. 139, No. 2 L28–30, 1992.

In forming the membrane-electrode assembly of the MEA embodiment of the present invention, the membrane is used as a substrate for the electrochemically active material. The membrane of the present invention may be made of a polymer having cation exchange groups which can transport protons across the membrane. The cation exchange group is preferably selected from the groups consisting of sulfonate, carboxylate, phosphonate, imide, sulfonimide and sulfonamide groups. Various known cation exchange polymers can be used including polymers and copolymers of trifluoroethylene, tetrafluoroethylene, styrene-divinyl benzene, α,β,β-trifluorstyrene, etc., in which cation exchange groups have been introduced. α,β,β-trifluorstyrene polymers useful for the practice of the invention are disclosed in U.S. Pat. No. 5,422,411. The polymer may be a hydrophobic polymer, a hydrophilic polymer or a mixture of such polymers.

The polymer used for the membrane of the present invention may comprise a polymer backbone and recurring side chains attached to the backbone with the side chains carrying the cation exchange groups. Preferably, the membrane comprises a copolymer of at least two fluoro or perfluoro monomers, wherein at least one of the monomers has pendant at least one, if not plural, sulfonic acid groups. For example, copolymers of a first fluorinated vinyl monomer and a second fluorinated vinyl monomer having a cation exchange group or a cation exchange group precursor can be used, e.g., sulfonyl fluoride groups (—SO$_2$F) which can be subsequently hydrolyzed to sulfonic acid groups. Possible first monomers include tetrafluoroethylene, hexafluoropropylene, vinyl fluoride, vinylidine fluoride, trifluorethylene, chlorotrifluoroethylene, perfluoro(alkyl vinyl ether), and mixtures thereof. Possible second monomers include a variety of fluorinated vinyl ethers with cation exchange groups or precursor groups.

The polymer in accordance with the invention is an essentially perfluorinated polymer which preferably has a polymer backbone which is highly fluorinated and which has ion exchange groups which are sulfonate groups. The term "sulfonate groups" is intended to refer either to sulfonic acid groups or alkali metal or ammonium salts of sulfonic acid groups. "Highly fluorinated" means that at least 90% of the total number of halogen and hydrogen atoms are fluorine atoms. Most preferably, the polymer backbone is essentially perfluorinated. It is also preferable for the side chains to be highly fluorinated and, most preferably, the side chains are essentially perfluorinated.

A class of preferred polymers for use in the present invention include a highly fluorinated, most preferably perfluorinated, carbon backbone and the side chain is represented by the formula —(OCF$_2$CFR$_f$)$_a$—OCF$_2$CFR'$_f$SO$_3$X, wherein R$_f$ and R'$_f$ are independently selected from F, Cl or a perfluorinated alkyl group having 1 to 10 carbon atoms, a=0, 1 or 2, and X is H, an alkali metal, or NH$_4$. Polymers suitable for use with the present invention include those disclosed in U.S. Pat. Nos. 4,358,545 and 4,940,525, which have a side chain represented by the formula or O—CF$_2$CF$_2$SO$_3$X, where X is H, an alkali metal, or NH$_4$. Another polymer is a perfluorocarbon backbone having a side chain represented by the formula —O—CF$_2$CF(CF$_3$)—O—CF$_2$CF$_2$SO$_3$X, where X is H, an alkali metal, or NH$_4$. This polymer is available from E. I. du Pont de Nemours and Company (hereinafter referred to as "DuPont") under the trademark NAFION®, which is a copolymer of tetrafluoroethylene with vinyl ether with an SO$_3$X, or sulfonic acid, precursor group. Polymers of this type are disclosed in U.S. Pat. No. 3,282,875. One particular polymer used with the present invention is a copolymer polymerized from tetrafluoroethylene (TFE) and a vinyl ether which is represented by the formula CF$_2$=CF—O—CF$_2$CF(CF$_3$)—O—CF$_2$CF$_2$SO$_2$F.

The equivalent weight of the cation exchange polymer can be varied as desired for the particular application. For the purposes of this application, equivalent weight is defined to be the weight in grams of the polymer in sulfonic acid form required to neutralize one gram equivalent of NaOH. In the case where the polymer comprises a perfluorocarbon backbone and the side chain is —O—CF$_2$—CF(CF$_3$)—O—CF$_2$—CF$_2$—SO$_3$X, the equivalent weight preferably is 800–1500, most preferably 900–1200. The equivalent weight of the polymers disclosed in U.S. Pat. Nos. 4,358,545 and 4,940,525 is preferably somewhat lower, e.g., 600–1300.

In the manufacture of membranes using polymer which has a highly fluorinated polymer backbone and sulfonate ion exchange groups, membranes are typically formed from the polymer in its sulfonyl fluoride form since it is thermoplastic in this form, and conventional techniques for making films from thermoplastic polymer can be used. The sulfonyl fluoride, or SO$_2$F, form means that the side chain, before the membrane is hydrolyzed, has the formula [—OCF$_2$CF(CF$_3$)]$_n$—OCF$_2$CF$_2$SO$_2$F. Alternately, the polymer may be in another thermoplastic form such as by having —SO$_2$X groups where X is CH$_3$, CO$_2$, or a quaternary amine. Solution film casting techniques using suitable solvents for the particular polymer can also be used if desired.

A film of the polymer in sulfonyl fluoride form can be converted to the sulfonate form (sometimes referred to as ionic form) by hydrolysis using methods known in the art. For example, the membrane may be hydrolyzed to convert it to the sodium sulfonate form by immersing it in 25% by weight NaOH for about 16 hours at a temperature of about 90° C. followed by rinsing the film twice in deionized 90° C. water using about 30 to about 60 minutes per rinse. Another possible method employs an aqueous solution of 6–20% of an alkali metal hydroxide and 5–40% polar organic solvent such as dimethyl sulfoxide with a contact time of at least 5 minutes at 50–100° C. followed by rinsing for 10 minutes. After hydrolyzing, the membrane can be converted if desired to another ionic form by contacting the membrane in a bath containing a 1% salt solution containing the desired cation or, to the acid form, by contacting with an acid and rinsing. The membrane used in the membrane-electrode assembly of the present invention is usually in the sulfonic acid form.

The thickness of the membrane can be varied as desired for a particular electrochemical cell application. Typically, the thickness of the membrane is generally less than about 250 μm, preferably in the range of about 25 μm to about 150 μm.

The electrochemically active material is conventionally incorporated in a coating formulation, or "ink", which is applied to the membrane. The electrochemically active material in the form of particles having a particle diameter in the range of 0.1 micron ($\mu$) to 10$\mu$. The coating formulation, and consequently the anode and the cathode after the MEA is formed, also comprises a binder polymer for binding the particles of the electrochemically active material together. The particles of electrochemically active material, when coated with the binder polymer, have a tendency to agglomerate. By grinding the particles to a particularly small size, a better particle distribution may be obtained. Thus, in accordance with the present invention, the coating formulation is ground so that the particles have an average diameter of less than 5$\mu$, and in many cases, preferably less than 2$\mu$. This small particle size is accomplished by ball milling or grinding with an Eiger mini mill, which latter technique can produce particles of 1$\mu$ or less.

The binder polymer is dissolved in a solvent. The binder polymer may be the same polymer as that used for the membrane, as described herein, but it need not be. The binder polymer may be a variety of polymers, such as polytetrafluoroethylene (PTFE). In a preferred embodiment, the binder polymer is a perfluorinated sulfonic acid polymer, and the side chain of the binder polymer, before hydrolyzation of the binder polymer, is represented by the formula [—$OCF_2CF(CF_3)$]$_n$—$OCF_2CF_2SO_2F$ (i.e., the $SO_2F$, or sulfonyl fluoride form). The side chain, after hydrolyzation, is represented by the formula [—$OCF_2CF(CF_3)$]$_n$—$OCF_2CF_2SO_3H$ (i.e., the $SO_3H$, sulfonic acid, or acid form). When the binder polymer is in the sulfonyl fluoride form, the solvent can be a variety of solvents, such as FLUOROINERT FC-40, commercially available from 3M of St. Paul, Minn., which is a mixture of perfluoro(methyl-di-n-butyl) amine and perfluoro(tri-n-butylamine). In this embodiment, a copolymer polymerized from tetrafluoroethylene and a vinyl ether which is represented by the formula $CF_2$=CF—O—$CF_2CF(CF_3)$—O—$CF_2CF_2SO_2F$ has been found to be a suitable binder polymer. In addition, ruthenium dioxide has been found to be a suitable catalyst. The sulfonyl fluoride form has been found to be compatible with FC-40 and to give a uniform coating of the ruthenium dioxide catalyst on the membrane.

The viscosity of the ink can be controlled by (i) selecting particle sizes, (ii) controlling the composition of the particles of electrochemically active material and binder, or (iii) adjusting the solvent content (if present). The particles of electrochemically active material are preferably uniformly dispersed in the polymer to assure that a uniform and controlled depth of the catalyst layer is maintained, preferably at a high volume density with the particles of electrochemically active material being in contact with adjacent particles to form a low resistance conductive path through the catalyst layer. The ratio of the particles of electrochemically active material to the binder polymer may be in the range of about 0.5:1 to about 8:1, and in particular in the range of about 1:1 to about 5:1. The catalyst layer formed on the membrane should be porous so that it is readily permeable to the gases/liquids which are consumed and produced in cell. The average pore diameter is preferably in the range of 0.01 to 50 $\mu$m, most preferably 0.1 to 30 $\mu$m. The porosity is generally in a range of 10 to 99%, preferably 10 to 60%.

The area of the membrane to be coated with the ink may be the entire area or only a select portion of the surface of the membrane. The catalyst ink may be deposited upon the surface of the membrane by any suitable technique including spreading it with a knife or blade, brushing, pouring, metering bars, spraying and the like. If desired, the coatings are built up to the thickness desired by repetitive application. Areas upon the surface of the membrane which require no particles of electrochemically active material can be masked, or other means can be taken to prevent the deposition of the particles of electrochemically active material upon such areas. The desired loading of particles of electrochemically active material upon the membrane can be predetermined, and the specific amount of particles of electrochemically active material can be deposited upon the surface of the membrane so that no excess electrochemically active material is applied.

A particularly advantageous method of applying electrochemically active particles to a membrane is to use a screen printing process. It is preferable to use a screen having a mesh number of 10 to 2400, especially mesh number of 50 to 1000 and a thickness in the range of 1 to 500 $\mu$m. It is preferable to select the mesh and the thickness of the screen and control the viscosity of the ink so as to give the thickness of the catalyst layer ranging from 1$\mu$ to 50$\mu$, especially 5$\mu$ to 15$\mu$. The screen printing can be repeated as needed to apply the desired thickness. Two to four passes, usually three passes, have been observed to produce the optimum performance. After each application of the ink, the solvent is preferably removed by warming the catalyst layer to about 50° C. to 140° C., preferably about 75° C.

A screen mask may be used for forming a catalyst layer having a desired size and configuration on the surface of the cation-exchange membrane. The configuration is preferably a printed pattern matching the configuration of the catalyst layer. The substances for the screen and the screen mask can be any materials having satisfactory strength such as stainless steel, poly(ethylene terephthalate) and nylon for the screen and epoxy resins for the screen mask.

After depositing the catalyst layer, it is preferable to fix the ink on the surface of the membrane so that a strongly bonded catalyst layer and the cation-transporting membrane can be obtained. The ink may be fixed upon the surface of the membrane by any one or a combination of pressure, heat, adhesive, binder, solvent, electrostatic, and the like. A preferred method for fixing the ink upon the surface of the membrane employs pressure, heat or by a combination of pressure and heat. The catalyst layer is preferably pressed onto the surface of the membrane at 100° C. to 300° C., most preferably 150° C. to 280° C., under a pressure of 510 to 51,000 kPa (5 to 500 ATM), most preferably 1,015 to 10,500 kPa (10 to 100 ATM).

An alternative to printing the catalyst layer directly onto the membrane is the so-called "decal" process. In this process, the catalyst ink is coated, painted, sprayed or screen printed onto a substrate and the solvent is removed. The resulting "decal" is then subsequently transferred from the substrate to the membrane surface and bonded, typically by the application of heat and pressure.

Although the present invention describes the use of a solid polymer electrolyte membrane, it is well within the scope of the invention to use other cation-transporting membranes which are not polymeric. For example, proton-conducting ceramics such as beta-alumina may be used. Beta-alumina is a class of nonstoichiometric crystalline compounds having the general structure $Na_2O_x \cdot Al_2O_3$, in which x ranges from 5 00($\beta$"-alumina) to 11 ($\beta$-alumina). This material and a number of solid electrolytes which are useful for the invention are described in the *Fuel Cell Handbook,* A. J. Appleby and F. R. Foulkes, Van Nostrand Reinhold, N.Y., 1989, pages 308–312. Additional useful solid state proton conductors, especially the cerates of strontium and barium, such as strontium ytterbiate cerate ($SrCe_{0.95}Yb_{0.05}O_{3-\alpha}$) and barium neodymiate cerate ($BaCe_{0.9}Nd_{0.01}O_{3-\alpha}$) are described in a final report, DOE/MC/24218-2957, Jewulski, Osif and Remick, prepared for the U.S. Department of Energy, Office of Fossil Energy, Morgantown Energy Technology Center by Institute of Gas Technology, Chicago, Ill., December, 1990.

As known to one skilled in the art, if electrodes, or a catalyst layer in the case of a membrane-electrode assembly, are placed on opposite faces of membrane, cationic charges (protons in the HCl reaction as described herein) are transported through the membrane from anode to cathode, while each electrode carries out a half-cell reaction. In the present invention, molecules of essentially anhydrous hydrogen halide are fed to anode-side inlet 12 of electrochemical cell 10 and are transported to the membrane-electrode assembly as described above. The molecules of the anhydrous hydrogen halide are oxidized to produce essentially dry halogen gas and protons. A portion of the essentially anhydrous hydrogen halide may be unreacted and exits the cell with the essentially dry halogen gas. The protons (H+) are transported through the membrane and reduced at the cathode to form either hydrogen gas in the first embodiment or water in the second embodiment, as will be explained below. A small amount of hydrogen halide, such as hydrogen chloride, is unreacted and is transported through the membrane from the anode towards the cathode.

The electrochemical cell of the present invention further comprises an anode diffuser 23 disposed in contact with the anode and a cathode diffuser 25 disposed in contact with the cathode. The anode diffuser provides a porous structure that allows the anhydrous hydrogen halide to diffuse through to the catalyst layer of the membrane-electrode assembly. In addition, both the anode diffuser and the cathode diffuser distribute current over the electrochemically active area of the membrane-electrode assembly. The diffusers are preferably made of graphite paper, and are typically 15–20 mil thick.

Figure 1A:
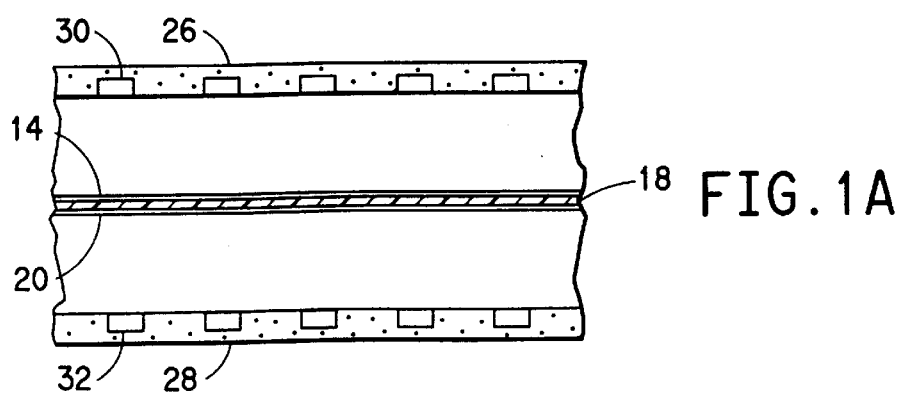
FIG. 1A is a cut-away, top cross-sectional view of the anode and cathode mass flow fields as shown in FIG. 1.

The electrochemical cell of the present invention further comprises an anode flow field 26 disposed in contact with the anode reactant diffuser and a cathode flow field 28 disposed in contact with the cathode reactant diffuser, as can be seen from FIGS. 1 and 2. The flow fields are electrically conductive, and act as both mass and current flow fields. More specifically, the mass flow fields may include a plurality of anode flow channels 30 and a plurality of cathode flow channels 32 as shown in FIG. 1A, which is a cut-away, top cross-sectional view showing only the flow fields of FIG. 1. It is within the scope of the present invention that the flow fields and the flow channels may have a variety of configurations. Also, the flow fields may be made in any manner known to one skilled in the art. Preferably, the anode and the cathode flow fields comprise porous graphite paper, and have a serpentine design as shown in particular in FIG. 2. Such flow fields are commercially available from Spectracorp, of Lawrence, Mass. The flow fields may alternatively be made of a porous carbon in the form of a foam, cloth or matte.

The purpose of the anode flow field and the flow channels formed therein is to get reactants, such as anhydrous HCl in the first and second embodiments, to the anode through anode-side inlet 14 and products, such as essentially dry chlorine gas in the first and second embodiments from the anode through anode-side outlet 16. The purpose of the cathode flow field and the flow channels formed therein is to get catholyte, such as liquid water in the first embodiment, or oxygen gas in the second embodiment, to the cathode through cathode-side inlet 22 and products, such as hydrogen gas in the first embodiment, or water vapor ($H_2O(g)$) in the second embodiment, from the cathode through cathode-side outlet 24. Water vapor may be needed to keep the membrane hydrated. However, water vapor may not be necessary in the second embodiment because of the water produced by the electrochemical reaction of the oxygen ($O_2$) added as discussed below.

The function and configuration of the flow fields is illustrated with respect to FIG. 2. As shown by the dotted lines in FIG. 1, a passage 15 is formed between the anode-side inlet and the cathode-side outlet, and a similar passage 17 is shown formed between the cathode-side inlet and the anode-side outlet. These passages carry the reactants into and the products out of the cell through the anode and cathode-side inlets, and the anode and cathode-side outlets. As shown in particular in FIG. 2, anhydrous hydrogen chloride (AHCl) enters the cell on the anode-side, and essentially dry chlorine gas ($Cl_2$) and unreacted HCl leave the cell on the anode side. On the cathode-side water or oxygen enters the cell, and hydrogen gas or water, along with dilute HCl leaves the cell on the cathode side.

The electrochemical cell of the present invention may also comprise an anode-side gasket 34 and a cathode-side gasket 36 as shown in FIG. 1. Gaskets 34 and 36 form a seal between the interior and the exterior of the electrochemical cell. Preferably, these gaskets are made of the terpolymer ethylene/propylene/diene (EPDM).

The electrochemical cell of the present invention also comprises an anode current bus 38 and a cathode current bus 40 as shown in FIG. 1. The current buses conduct current to and from a voltage source (not shown). Specifically, anode current bus 38 is connected to the positive terminal of a voltage source, and cathode current bus 40 is connected to the negative terminal of the voltage source, so that when voltage is supplied to the cell, the anode is at a higher potential than the cathode, and current flows through all of the cell components to the right of current bus 38 as shown in FIG. 1, including current bus 40, from which it returns to the voltage source. The current buses are made of a conductor material, such as copper.

The electrochemical cell of the present invention may further comprise an anode current distributor 42 as shown in FIGS. 1 and 2. The anode current distributor collects current from the anode current bus and distributes it to the anode by electronic conduction. The anode current distributor may comprise a fluoropolymer which has been loaded with a conductive material. In one embodiment, the anode current distributor may be made from polyvinylidene fluoride, sold under the trademark KYNAR® (hereinafter referred to as "KYNAR®") by Elf Atochem North America, Inc. Fluoropolymers, and graphite.

The electrochemical cell of the present invention may further comprise a cathode current distributor 44 as shown in FIGS. 1 and 2. The cathode current distributor collects current from the cathode and for distributing current to the cathode bus by electronic conduction. The cathode current distributor also provides a barrier between the cathode current bus and the cathode and the hydrogen halide. This is desirable because there is some migration of hydrogen halide through the membrane. Like the anode current distributor, the cathode current distributor may comprise a fluoropolymer, such as KYNAR®, which has been loaded with a conductive material, such as graphite.

The electrochemical cell of the present invention also includes an anode-side stainless steel backer plate (not shown), disposed on the outside of the cell next to the anode current distributor, and a cathode-side stainless steel backer plate (also not shown), disposed on the outside of the cell next to the cathode current distributor. These steel backer plates have bolts extending therethrough to hold the components of the electrochemical cell together add mechanical stability thereto.

When more than one anode-cathode pair is used, such as in manufacturing, a bipolar arrangement, as familiar to one skilled in the art, is preferred. The electrochemical cell of the present invention may be used in a bipolar stack. To create such a bi-polar stack, anode current distributor 42 and every element to the right of anode current distributor 42 as shown in FIGS. 1 and 2, up to and including the cathode current distributor, are repeated along the length of the cell, and current buses are placed on the outside of the stack.

Further in accordance with the present invention, there is provided a process for directly converting essentially anhydrous hydrogen halide to essentially dry halogen gas. In operation, a voltage is applied to the anode and the cathode so that the anode is at a higher potential than the cathode, and current flows to the anode bus. Anode current distributor 40 collects current from the anode bus and distributes it, along with anode diffuser 23, to the anode by electronic conduction. Molecules of essentially anhydrous hydrogen chloride gas are fed to anode-side inlet 14 and through flow channels 30 in the anode mass flow field 26 and are transported to the surface of anode 12. The molecules are oxidized at the anode under the potential created by the voltage source to produce essentially dry chlorine gas at the anode, and protons (H$^+$). This reaction is given by the equation:

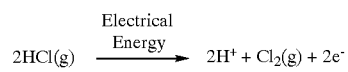

(1)

The chlorine gas exits through anode-side outlet 16 as shown in FIG. 1 and is recovered.

The protons are transported through the membrane, which acts as an electrolyte. The transported protons are reduced at the cathode. This reaction is given by the equation:

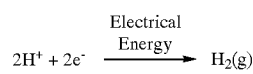

(2)

Water is delivered to the cathode through cathode-side inlet 22 as shown in FIG. 1 and through the channels in cathode mass flow field 28 to hydrate the membrane and thereby increase the efficiency of proton transport through the membrane. In the first embodiment, the hydrogen which is evolved at the interface between the cathode and the membrane exits via cathode-side outlet 24. The hydrogen bubbles through the water and is not affected by the electrode. Cathode current distributor 44 collects current from cathode 20, along with cathode diffuser 25, and distributes it to cathode bus 40.

In the second embodiment, a voltage is applied to the anode and the cathode so that the anode is at a higher potential than the cathode, and current flows to the anode bus. Anode current distributor 40 collects current from the anode bus and distributes it, along with anode diffuser 23, to the anode by electronic conduction. Molecules of essentially anhydrous hydrogen chloride are fed to anode-side inlet 14 and are transported through channels of anode mass flow field 26 to the surface of anode 12. An oxygen-containing gas, such as oxygen (O$_2$(g)), air or oxygen-enriched air (i.e., greater than 21 mol % oxygen in nitrogen) is introduced through cathode-side inlet 22 and through the channels formed in cathode mass flow field 28. Although air is cheaper to use, cell performance is enhanced when enriched air or oxygen is used. This cathode feed gas may be humidified to aid in the control of moisture in the membrane. Molecules of the hydrogen chloride (HCl(g)) are oxidized under the potential created by the voltage source to produce essentially dry chlorine gas at the anode, and protons (H$^+$), as expressed in equation (1) above. The chlorine gas (Cl$_2$) exits through anode-side outlet 16 as shown in FIG. 1 and is recovered.

The protons (H$^+$) are transported through the membrane, which acts as an electrolyte. Oxygen and the transported protons are reduced at the cathode to water, which is expressed by the equation:

$$\tfrac{1}{2}\,O_2(g) + 2e^- + 2H^+ \rightarrow H_2O(g) \qquad (3)$$

The water formed (H$_2$O(g) in equation (3)) exits via cathode-side outlet 24 as shown in FIG. 1, along with any nitrogen and unreacted oxygen. The water also helps to maintain hydration of the membrane, as will be further explained below. Cathode current distributor 44 collects current from cathode 20 and distributes it, along with cathode diffuser 25, to cathode bus 40.

In this second embodiment, the cathode reaction is the formation of water. This cathode reaction has the advantage of more favorable thermodynamics relative to H$_2$ production at the cathode as in the first embodiment. This is because the overall reaction in this embodiment, which is expressed by the following equation:

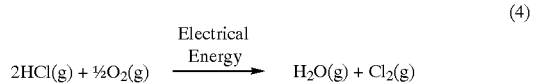

(4)

involves a smaller free-energy change than the free-energy change for the overall reaction in the first embodiment, which is expressed by the following equation:

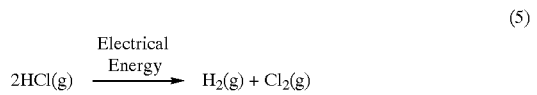

(5)

Thus, the amount of voltage or energy required as input to the cell is reduced in this second embodiment.

The membrane of both the first and the second embodiments must be hydrated in order to have efficient proton transport. Thus, in the first and second embodiments, the cathode-side of the membrane must be kept hydrated in order to increase the efficiency of proton transport through the membrane. In the first embodiment, which has a hydrogen-producing cathode, the hydration of the membrane is obtained by keeping liquid water in contact with the cathode. The liquid water passes through the electrodes of the membrane-electrode assembly and contacts the membrane. In the second embodiment, which has a water-producing cathode, the membrane hydration is accomplished by the production of water as expressed by equation (3) above and by the water introduced in a humidified oxygen-feed or air-feed stream. This keeps the conductivity of the membrane high.

For the electrochemical cell of the first embodiment, a voltage in the range of 1.0 to 2.0 volts may be applied. A current density of greater than 5.38 kA/m$^2$ (500 amps/ft$^2$, which is achieved in the Uhde system of the prior art) may be achieved at a voltage of 2 volts or less. In fact, a current density in the range of 8–16 kA/m$^2$ or greater may be achieved, with 8–12 kA/m$^2$ being the average range for current density at a voltage of 1.8 to 2.0 volts. The current efficiency, that is, the amount of electrical energy consumed in converting anhydrous hydrogen halide to halogen gas, of the electrochemical cell of either the first or the second embodiment, is on the order of 98%–99%. In addition, in either of the first or second embodiments, the electrochemical cell has a utility, that is, conversion per pass, or mole fraction of anhydrous hydrogen halide converted to essentially dry halogen gas per single pass in the range of 50%–90%, with 70% being the average. The amount of water, in the vapor state, in the anolyte outlet due to membrane hydration is less than 400 parts per million (ppm), and is typically in the range of 200–400 ppm.

The electrochemical cell of either embodiment of the present invention can be operated at higher temperatures at a given pressure than electrochemical cells of the prior art which convert aqueous hydrogen chloride to chlorine. This affects the kinetics of the reactions and the conductivity of the membrane. Higher temperatures result in lower cell voltages. However, limits on temperature occur because of the properties of the materials used for elements of the cell. For example, the properties of a NAFION® membrane change when the cell is operated above 120° C. The properties of a polymer electrolyte membrane make it difficult to operate a cell at temperatures approaching 150° C. Thus, a range of operating temperatures for a polymer electrolyte membrane is 40° C.–120° C. However, with a membrane made of other materials, such as ceramic material like beta-alumina, it is possible to operate a cell at temperatures about 200° C. Room temperature operation is possible, with the attendant advantage of ease of use of the cell. However, operation at elevated temperatures provides the advantages of improved kinetics and increased water activity for membrane hydration. A preferred range of temperatures is 60° C.–90° C.

It should also be noted that one is not restricted to operate the electrochemical cell of either the first or the second embodiment at atmospheric pressure. The cell may be run at different pressures, which change the transport characteristics of water or other components in the cell, including the membrane. A range of operating pressures is 30–110 psig, with 60–110 preferred.

The present invention will be illustrated by the following Example.

EXAMPLE

Preparation of the Coating Formulation

The coating formulation for an MEA was prepared by adding 15 g of a 50 m$^2$/g ruthenium dioxide (RuO$_2$) catalyst, P-2450, commercially available from Colonial Metals, Inc. of Elkton, Md., to an empty flask which had been purged with dry nitrogen. After additional purging with nitrogen, 200 g of a solution containing a binder polymer, 2.5 wt. % copolymer polymerized from tetrafluoroethylene (TFE) and a vinyl ether which is represented by the formula CF$_2$=CF—O—CF$_2$CF(CF$_3$)—O—CF$_2$CF$_2$SO$_2$F dissolved in the solvent FC-40, was added to a flask with constant stirring. The ratio of the catalyst particles to the binder polymer was 3:1.

After the catalyst was fully suspended, the mixture was transferred to a laboratory ball mill and was ground overnight. After the grinding, the particle size of the ruthenium dioxide in the mixture was, on the average, about 5$\mu$, with many particles being less than 2$\mu$. The mixture was transferred again to a flask. Then 75–80 g of solvent were allowed to evaporate under a nitrogen purge to thicken the coating formulation and form a homogeneous mixture.

Preparation of the MEA

An unhydrolyzed membrane which was 5 mil thick and made of a copolymer polymerized from tetrafluoroethylene (TFE) and a vinyl ether which is represented by the formula CF$_2$=CF—O—CF$_2$CF(CF$_3$)—O—CF$_2$CF$_2$SO$_2$F and having a nominal equivalent weight of 1100 was used as a substrate. One side of the membrane was screen-printed with the coating formulation to a depth of approximately 0.003", or 0.3 mils to form an MEA. The printed coating formulation was a 2.05 cm×2.85 cm rectangle. The coating formulation was allowed to air dry. The membrane was re weighed, then coated again on the other side. The second coating was aligned to be precisely opposite the first. The second coating was allowed to air dry, and then the membrane was re weighed again. On an expanded basis, (where the membrane was expanded as described below) the loadings were 1.04 mg RuO$_2$/cm$^2$ on the one side, and 1.15 mg RuO$_2$/cm$^2$ on the other side of the membrane.

The MEA was sandwiched between two pieces of a fluoropolymer film, sold under the trademark TEFLON® FEP by DuPont, then heat pressed for two minutes at 120° C. at slight pressure. After cooling, the MEA was removed from the sandwich and placed in a standard hydrolysis bath (64% water, 20% 1-methoxy-2-propanol, 16% KOH) for two hours at 75° C. After removal from the bath, the MEA was rinsed in deionized water for 20 minutes, boiled in DI water for 1 hour, then briefly rinsed again.

The hydrolyzed MEA was then boiled in a 10% nitric acid solution for one hour, then removed from the acid bath and rinsed a final time in DI water. The expanded area of the coating was 2.35"×3.2" (approximately 49 cm$^2$).

The MEA was then placed in the electrochemical cell of the present invention. The cell included stainless steel backer plates, copper anode and cathode buses and a current distributor on both the anode side and the cathode side of the cell. Each of the current distributors was made KYNAR®-graphite. In addition, the cell included porous graphite paper mass flow fields adjacent to each of the current distributors, and graphite paper distributors between the flow fields and the membrane electrode assembly.

Figure 3:
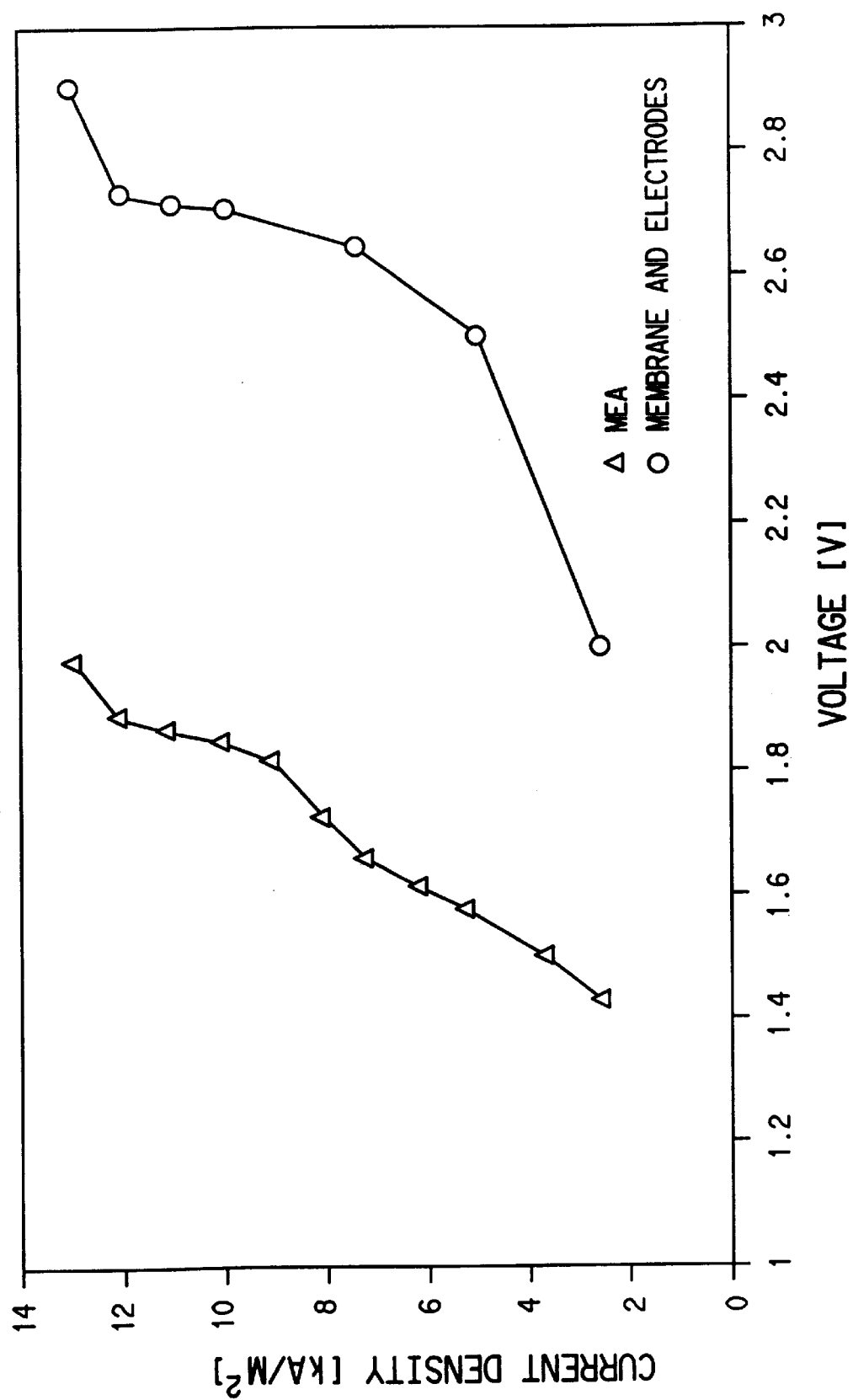
FIG. 3 is a graph which plots current density vs. voltage for the membrane-electrode assembly of the present invention and for another electrochemical cell.

Anhydrous hydrogen chloride, HCl, at a pressure of 30 psi was fed to the cell at a rate of 0.9 standard liters per minute (SLPM). The cell was heated to 70° C. and DI water was recirculated on the cathode-side of the membrane. The cell was operated under current control and a current density of up to 13 kA/m$^2$ was obtained at less than 2 V. The current-voltage curve is shown in FIG. 3.

COMPARATIVE EXAMPLE

In this Example, a cell as described above was used, except that no diffuser was used, and instead of a membrane-electrode assembly, a ruthenium dioxide catalyst coated carbon cloth, which acted as a separate electrode, was placed between the flow field and a perfluorinated sulfonic acid membrane on each side of the membrane. The catalyst-coated side of the carbon cloth was oriented toward the membrane. Anhydrous HCl at a pressure of 30 psi was fed to the cell at a rate of 0.9 SLPM. The cell was heated to 80° C., and DI water was recirculated on the cathode-side of the membrane. The current-voltage curve is shown in FIG. 3 also. As can be seen from FIG. 3, a given current density can be obtained at a much lower voltage by using a membrane-electrode assembly according to the present invention than by using a separate membrane and electrodes.

Additional advantages and modifications will readily occur to those skilled in the art. The invention, in its broader aspects, is therefore not limited to the specific details and representative apparatus shown and described. Accordingly, departures may be made from such details without departing from the spirit or scope of the general inventive concept as defined by the appended claims and their equivalents.

What is claimed is:

1. An electrochemical cell for the direct production of essentially anhydrous hydrogen halide to essentially dry halogen gas comprising a membrane electrode assembly, wherein the membrane electrode assembly includes:
   (a) means for oxidizing molecules of essentially anhydrous hydrogen halide to produce essentially dry halogen gas and protons;
   (b) cation-transporting means for transporting the protons therethrough, wherein the oxidizing means is disposed in contact with one side of the cation-transporting means; and
   (c) means for reducing the transported protons disposed in contact with the other side of the cation-transporting means, wherein the oxidizing means and the reducing means comprises particles of an electrochemically active material applied to the cation-transporting means.

2. The electrochemical cell of claim 1, wherein the oxidizing means is an anode, the reducing means is a cathode and the cation-transporting means is a membrane.

3. The electrochemical cell of claim 2, wherein the membrane comprises a copolymer of at least two monomers, wherein at least one of the monomers has a pendant sulfonic acid group.

4. The electrochemical cell of claim 3, wherein the copolymer is polymerized from tetrafluoroethylene and a perfluorinated vinyl ether with a sulfonic acid precursor group.

5. The electrochemical cell of claim 4, wherein the electrochemically active material of each of the anode and the cathode is selected from the group consisting of: platinum, ruthenium, osmium, rhodium, iridium, palladium, tin and titanium and the oxides, alloys and mixtures thereof.

6. The electrochemical cell of claim 5, wherein the electrochemically active material of the anode and the cathode comprises ruthenium dioxide.

7. The electrochemical cell of claim 5, wherein the electrochemically active material of the anode comprises ruthenium dioxide and the electrochemically active material of the cathode comprises platinum.

8. The electrochemical cell of claim 5, wherein the electrochemically active material of the anode and the cathode comprises platinum.

9. The electrochemical cell of claims 2 or 6, wherein the anode and the cathode further comprise a binder polymer for binding the particles of the electrochemically active material together.

10. The electrochemical cell of claim 9, wherein the binder polymer is a perfluorinated sulfonic acid polymer.

11. The electrochemical cell of claim 9, wherein the ratio of the particles of the electrochemically active material to the binder polymer is in the range of about one to one to about five to one.

12. The electrochemical cell of claim 10, wherein the particles of the electrochemically active material have an average diameter of less than 5 microns.

13. An electrochemical cell for the direct production of essentially dry halogen gas from essentially anhydrous hydrogen halide, comprising:
   (a) means for oxidizing molecules of essentially anhydrous hydrogen halide to produce essentially dry halogen gas and protons;
   (b) proton-transporting means for transporting the protons therethrough, wherein the oxidizing means is disposed in contact with one side of the proton-transporting means and the proton-transporting means is a membrane comprising a copolymer of at least two monomers, and at least one of the monomers has a pendant sulfonic acid group; and
   (c) means for reducing the transported protons, wherein the reducing means is disposed in contact with the other side of the proton-transporting means.

14. The electrochemical cell of claim 13, wherein the copolymer is polymerized from tetrafluoroethylene and a perfluorinated vinyl ether with a sulfonic acid precursor group.

15. The electrochemical cell of claim 13, wherein the oxidizing means is an anode and the reducing means is a cathode.

16. The electrochemical cell of claim 15, wherein the anode and the cathode each comprise particles of an electrochemically active material applied to the membrane.

17. The electrochemical cell of claim 13, wherein the anode and the cathode each comprise an electrochemically active material.

18. The electrochemical cell of claim 17, wherein the loading of the electrochemically active material is at least 0.017 mg/cm$^2$.

19. The electrochemical cell of claim 17, wherein the anode and the cathode are gas diffusion electrodes.

20. The electrochemical cell of claim 19, wherein the loading of the electrochemically active material is in the range of 0.10 to 0.50 mg/cm$^2$.

21. The electrochemical cell of claims 17 or 19, wherein the electrochemically active material is selected from the group consisting of: platinum, ruthenium, osmium, rhenium, rhodium, iridium, palladium, gold, titanium, zirconium and tin, and the oxides, alloys and mixtures thereof.

22. The electrochemical cell of claim 21, wherein the electrochemically active material of the anode comprises ruthenium dioxide and the electrochemically active material of the cathode comprises platinum.

23. The electrochemical cell of claim 21, wherein the electrochemically active material of the anode and the cathode comprises ruthenium dioxide.

24. The electrochemical cell of claim 21, where the electrochemically active material of the anode and the cathode comprises platinum.

* * * * *